(12) United States Patent
VanBlon et al.

(10) Patent No.: US 10,536,409 B2
(45) Date of Patent: Jan. 14, 2020

(54) RELAYING AN INTERPERSONAL COMMUNICATION

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 93 days.

(21) Appl. No.: 15/611,592

(22) Filed: Jun. 1, 2017

(65) Prior Publication Data

US 2018/0351893 A1 Dec. 6, 2018

(51) Int. Cl.
*H04L 12/58* (2006.01)
*H04M 7/00* (2006.01)

(52) U.S. Cl.
CPC .............. *H04L 51/10* (2013.01); *H04L 51/14* (2013.01); *H04L 51/20* (2013.01); *H04M 7/0003* (2013.01); *H04M 7/0024* (2013.01)

(58) Field of Classification Search
CPC .............. G06F 11/2018; G10L 15/265; H04L 12/1859; H04L 12/6418; H04L 63/10; H04L 67/101; H04L 51/10; H04L 51/20; H04L 51/14; H04M 1/6505; H04M 3/02; H04M 3/42212; H04M 7/0024; H04M 7/0003; H04Q 3/005; H04W 76/10
See application file for complete search history.

(56) References Cited

U.S. PATENT DOCUMENTS

| | | | | |
|---|---|---|---|---|
| 5,875,240 A | * | 2/1999 | Silverman | H04M 3/46 379/133 |
| 6,614,781 B1 | * | 9/2003 | Elliott | H04L 12/6418 370/352 |
| 8,600,012 B1 | * | 12/2013 | Zhang | H04M 3/02 379/67.1 |
| 2007/0104186 A1 | * | 5/2007 | Kramer | H04L 63/10 370/352 |
| 2007/0106808 A1 | * | 5/2007 | Vemula | H04L 12/1859 709/230 |
| 2008/0155310 A1 | * | 6/2008 | Langen | G06F 11/2028 714/6.12 |
| 2008/0187108 A1 | * | 8/2008 | Engelke | G10L 15/265 379/52 |
| 2009/0279556 A1 | * | 11/2009 | Selitser | H04L 67/101 370/401 |
| 2010/0183128 A1 | * | 7/2010 | Logan | H04M 1/6505 379/88.22 |
| 2013/0005316 A1 | * | 1/2013 | Bienn | H04Q 3/005 455/417 |
| 2016/0072955 A1 | * | 3/2016 | Barkan | H04M 3/42212 455/417 |
| 2016/0360503 A1 | * | 12/2016 | Rauenbuehler | H04W 76/10 |

* cited by examiner

*Primary Examiner* — Le H Luu
(74) *Attorney, Agent, or Firm* — Kunzler Bean & Adamson

(57) ABSTRACT

For relaying interpersonal communication, a processor detects an interpersonal communication from an originator. The processor further identifies a target person of the interpersonal communication. In addition, the processor determines whether the interpersonal communication was heard by the target person. In response to determining the interpersonal communication was not heard by the target person, the processor relays the interpersonal communication through a second electronic device.

18 Claims, 8 Drawing Sheets

US 10,536,409 B2

RELAYING AN INTERPERSONAL COMMUNICATION

FIELD

The subject matter disclosed herein relates to interpersonal communications and more particularly relates to relaying interpersonal communications.

BACKGROUND

A verbal interpersonal communication to a person that is at a moderate distance may be unintelligible to the person.

BRIEF SUMMARY

An apparatus for relaying interpersonal communication is disclosed. The apparatus includes a microphone, a processor, and a memory that stores code that is executable by the processor. The processor detects an interpersonal communication from an originator with the microphone. The processor further identifies a target person of the interpersonal communication. In addition, the processor determines whether the interpersonal communication was heard by the target person. In response to determining the interpersonal communication was not heard by the target person, the processor relays the interpersonal communication through a second electronic device. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
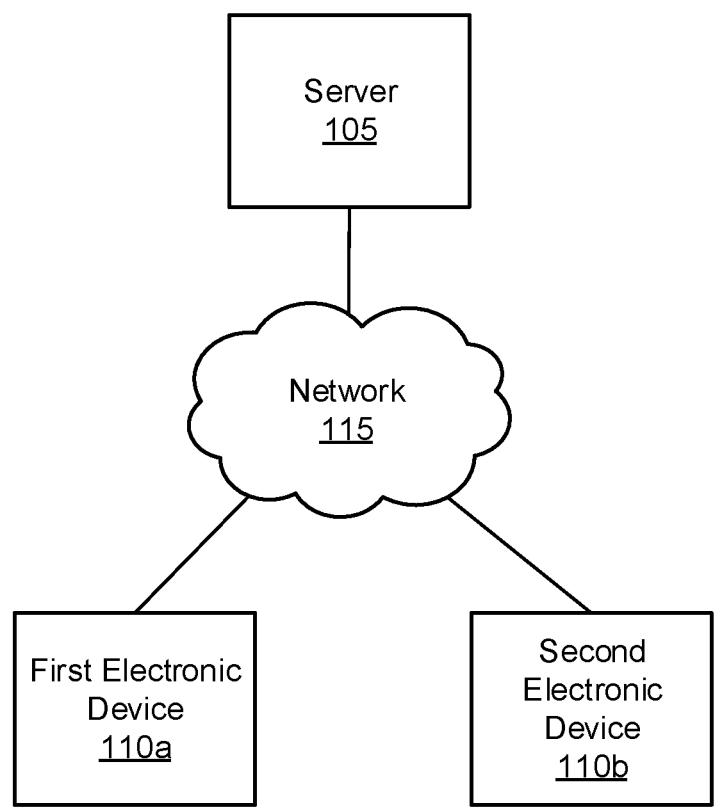
FIG. 1A is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a communication system 100. The communication system 100 may relay interpersonal communications between persons when vocal communications may not be effective. For example, two persons may be communicating between floors of the house. In the depicted embodiment, the communication system 100 includes a server 105, a network 115, and one or more electronic devices 110*a-b*. The network 115 may be the Internet, a local area network, a Wi-Fi network, a wide-area network, a mobile telephone network, or combinations thereof. The server 105 and the electronic devices 110*a-b* may communicate through the network 115.

The electronic devices 110 may be disposed in an environment such as a home or office. In addition, the electronic devices 110 may be carried by with one or more persons. The server 105 may reside in a central server farm.

An originator may speak to a target person, wherein speaking comprises an interpersonal communication. Unfortunately, the interpersonal communication may be unintelligible to the target person. For example, the target person may be unable to hear or understand portions of the interpersonal communication. In addition, ambient noise, other communications, and the like may mask portions of the interpersonal communication. As a result, the interpersonal communication may not be received by the target person.

The embodiments described herein relay interpersonal communications when needed. The embodiments may detect the interpersonal communication from the originator. The embodiments may further identify the target person of the interpersonal communication and determine whether the interpersonal communication was heard by the target person. In response to determining that the interpersonal communication is not heard by the target person, the embodiments may relay the interpersonal communication as will be described hereafter.

Figure 1B:
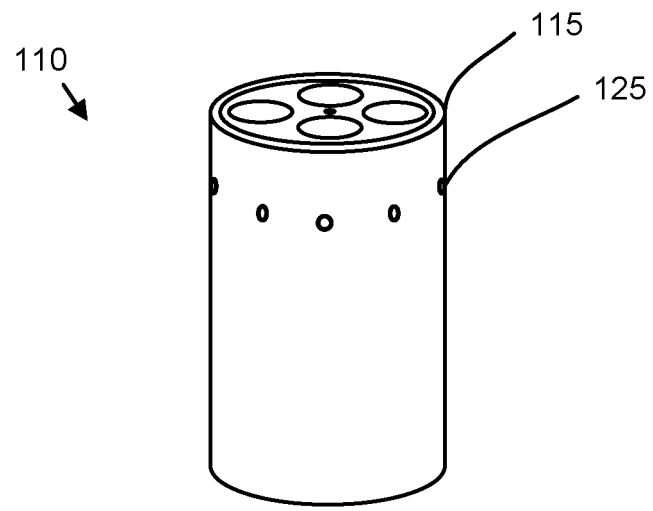
FIG. 1B is a perspective drawing illustrating one embodiment of an electronic device.

FIG. 1B is a perspective drawing illustrating one embodiment of an electronic device 110. In the depicted embodiment, the electronic device 110 is a virtual assistant electronic device 110. The electronic device 110 includes one or more microphones 115. The electronic device 110 may also include a camera 125.

Figure 1C:
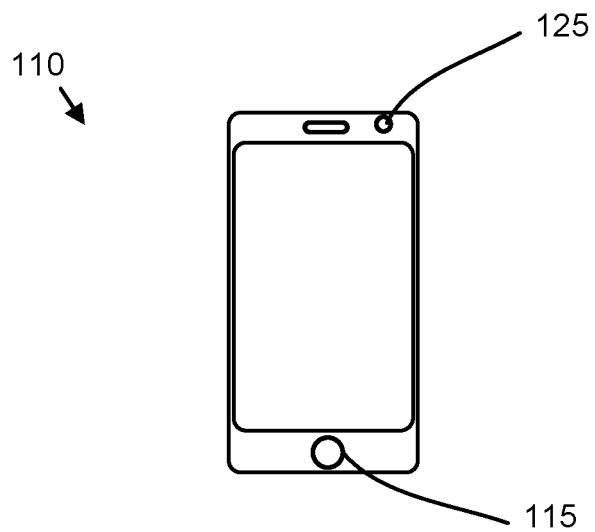
FIG. 1C is a front view drawing illustrating one embodiment of an electronic device.

FIG. 1C is a front view drawing illustrating one embodiment of an electronic device 110. In the depicted embodiment, the electronic device 110 is a mobile telephone electronic device 110. The electronic device 110 may include a microphone 115. The electronic device 110 may also include a camera 125.

Figure 2:
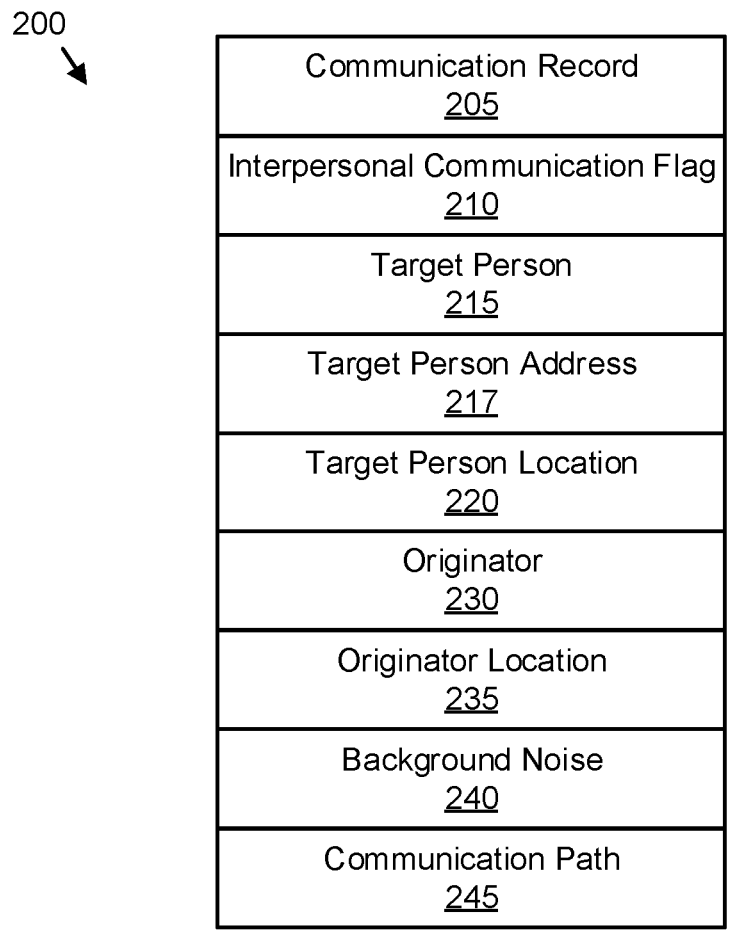
FIG. 2 is a schematic block diagram illustrating one embodiment of communication data.
Figure 2:
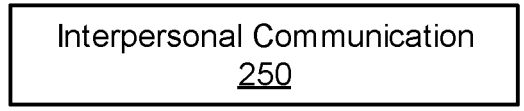

FIG. 2 is a schematic block diagram illustrating one embodiment of communication data 200. The communication data 200 may record and describe an interpersonal communication 250. The communication data 200 maybe organized as a data structure in a memory. The communication data 200 may reside on electronic device 110, the server 105, or combinations thereof. In the depicted embodiment, the communication data 200 includes a communication record 205, an interpersonal communication flag 210, a target person 215, a target person address 217, a target person location 220, an originator 230, an originator location 235, background noise 240, and a communication path 245. The interpersonal communication 250 is also shown.

The communication record 205 may record the audio of speech from a person such as the originator 230. The communication record 205 may be recorded by the first electronic device 110a. In addition, the communication record 205 may include the text of the speech. For example, the server 105 may perform a speech to text conversion on the speech and store the text in the communication record 205.

The interpersonal communication flag 210 may be set if the communication record 205 is of an interpersonal communication 250. In one embodiment, the interpersonal communication flag 210 is set in response to detecting the interpersonal communication 250. The detecting of the interpersonal communications 250 described in more detail in FIG. 5A.

The target person 215 may identify a person the interpersonal communication is directed to. The target person 215 may be identified from wake-up words. The target person address 217 may record an electronic address for communicating with the target person 215. For example, the target person address 217 may be a mobile telephone number.

The target person location 220 may identify a location of the target person 215. The target person location 220 may be a direction, a vector, a location within a building, a location within grounds of the building, and the like. In one embodiment, the target person location 220 is a location unknown indicator. The location unknown indicator may specify that the system 100 cannot determine the location of the target person 215.

The originator 230 may identify the speaker of the speech and/or interpersonal communication 250. The originator 230 may be identified from biometric data such as a voice print and/or an image captured by the first electronic device 110a.

The originator location 235 may identify a location of the originator 230. The originator location 235 may be a direction, a vector, a location within the building, a location within the grounds of the building, and the like. In addition, the originator location 235 may identify the location of the first electronic device 110a.

The background noise 230 may record noise levels at one or more electronic devices 110. In one embodiment, the background noise 230 records noise levels at the first electronic device 110a, the second electronic device 110b, and any intervening electronic devices 110.

The communication path 245 may specify one or more paths that the interpersonal communication may follow from the originator location 235 and the target person location 220.

The interpersonal communication 250 is also depicted. The interpersonal communication 250 is speech, and may be represented by the communication data 200.

Figure 3:
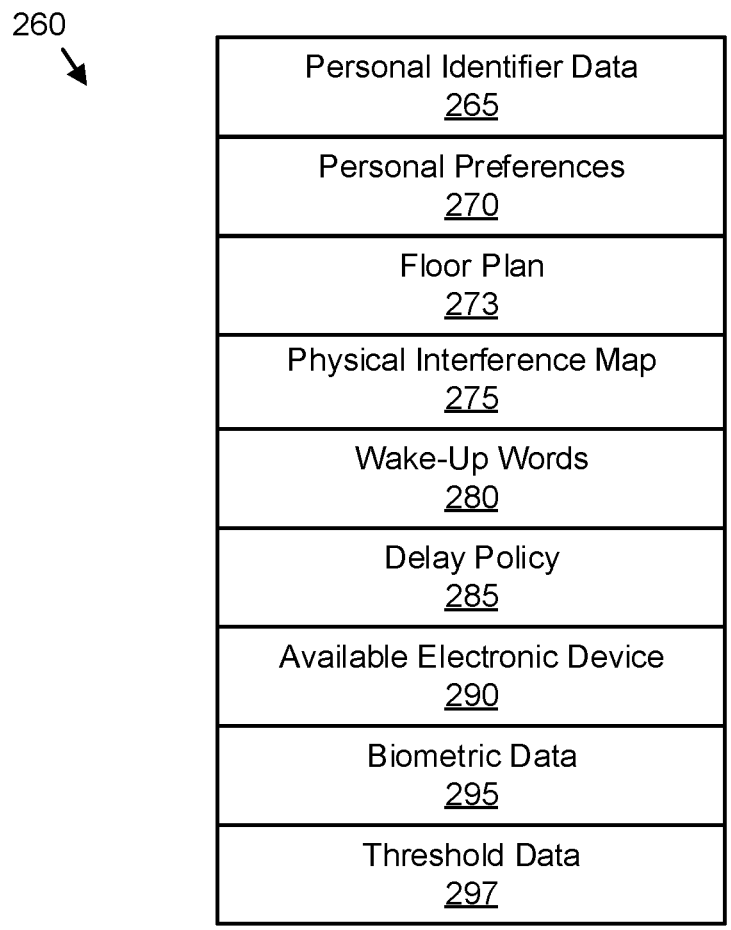
FIG. 3 is a schematic block diagram illustrating one embodiment of system data.

FIG. 3 is a schematic block diagram illustrating one embodiment of system data 260. The system data 260 may be used to process the communication data 200 for interpersonal communications 250. The system data 260 may be organized as a data structure in a memory. The system data 260 may reside on the electronic device 110, the server 105, or combinations thereof. In the depicted embodiment, the system data 260 includes personal identifier data 265, personal preferences 270, a floor plan 273, a physical interference map 275, wake-up words 280, a delay policy 285, an available electronic device 290, biometric data 295, and threshold data 297.

The personal identifier data 265 may include a personal identifier comprising one of a name and a nickname. The nickname may be a term of endearment. The person identifier data 265 may also include contact information. In one embodiment, the personal identifier data 265 is a contact list.

The personal preferences 270 may record learned preferences for one or more persons. The personal preferences 270 may include an estimate of hearing acuity, typical speaking volumes, and the like. The typical speaking volume may include the normalized speaking volume for the originator 230.

The floor plan 273 may specify the layout of a building and the surrounding grounds. The physical interference map 275 may record obstacles and interference to audio communication within the building. For example, the physical interference map 275 may estimate the attenuation to speech between two points in the building and or grounds. The physical interference map 275 may be expressed as a ratio of an attenuation of speech in an unobstructed environment between two points to attenuation of speech between two points based on the obstacles and other interference. In one embodiment, the physical interference map 275 is constructed by each electronic device 110 broadcasting brief bursts of white noise at a known volume and other electronic devices 110 recording the frequency response for the bursts. The system 100 may generate the physical interference map 275 based on such broadcasts from multiple locations.

The wake-up words 280 may record include one or more personal identifiers such as names and/or nicknames that identify and interpersonal communication 250. In one embodiment, one or more wake-up words 280 may be associated with personal identifier data 265. Table 1 shows one example of name related wake-up words.

TABLE 1

| Wake-up word 280 | Personal identifier data 265 |
|---|---|
| Carrie | Carrie Doe |
| Honey | Carrie Doe |
| Sport | Tyler Doe |
| Ty | Tyler Doe |

In addition, the wake-up words 280 may be request words and/or phrases. Table 2 lists request words and/or phrases that may be used as wake-up words 280.

TABLE 2

| Wake-up word 280 |
|---|
| Would you |
| Could you |
| Please |
| Help me |
| Do you know |
| Can you |
| Will you |
| Where is |

In one embodiment, the wake-up words 280 includes a wake-up word 280 that indicates that the interpersonal communication 250 should be relayed. For example, the wake-up word 280 "relay" may indicate that the originator 230 wishes the system 102 relay the interpersonal communication 250. The wake-up words 280 may be specified by a user. Alternatively, the wake-up words 280 may be determined from monitoring interpersonal communications 250. For example, if an originator 230 consistently uses a first word that is responded to by a first target person 215, the first word may be recorded as a wake-up word 280.

The delay policy 285 may specify circumstances for delaying relaying the interpersonal communication to the target person 215. The delay policy 285 may be satisfied by one or more of the target person 215 being in a conversation, the target person 215 being inaccessible, and the target person 215 requesting no disturbances.

The threshold data 297 may include a co-location threshold, a distance threshold, a noise threshold, an interference threshold, and the like.

Figure 4A:
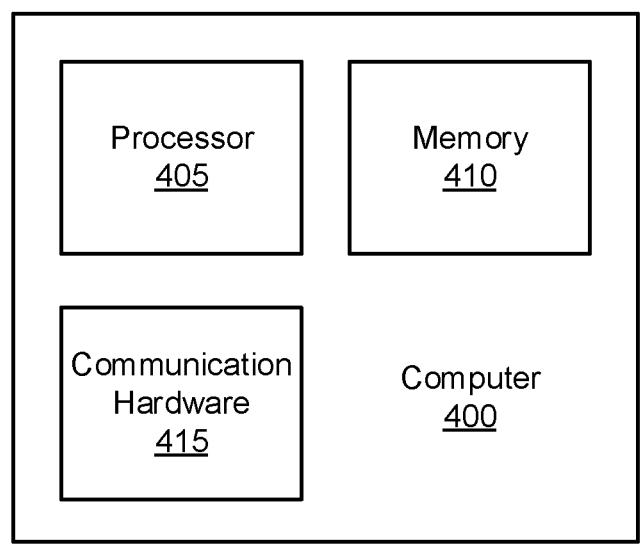
FIG. 4A is a schematic block diagram illustrating one embodiment of a computer.

FIG. 4A is a schematic block diagram illustrating one embodiment of a computer 400. The computer 400 may be embodied in the electronic device 110 and/or server 105. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 210 may store code. The processor 405 may execute the code. The computer 400 may communicate with other devices through the communication hardware 415.

Figure 4B:
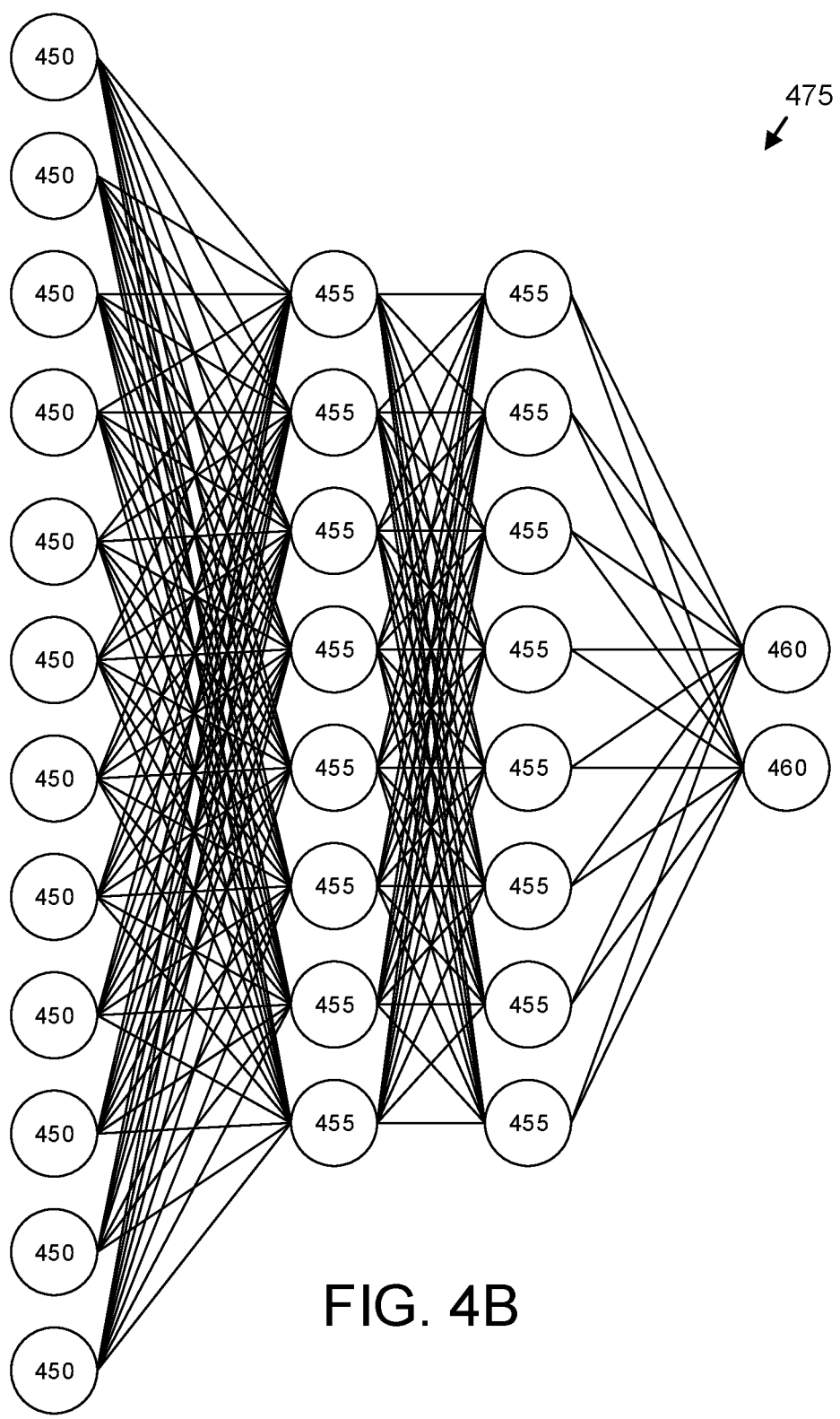
FIG. 4B is a schematic drawing illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, and the like.

The neural network 475 may be trained with training data. The training data may include the communication data 200 and the system data 260. The neural network 475 may be trained using one or more learning functions while applying the training data to the input neurons 450 and known result values for the output neurons 460. Subsequently, the neural network 475 may receive actual data at the input neurons 450 and make predictions at the output neurons 460 based on the actual data. The actual data may include data from the communication data 200 and the system data 260.

Figure 5A:
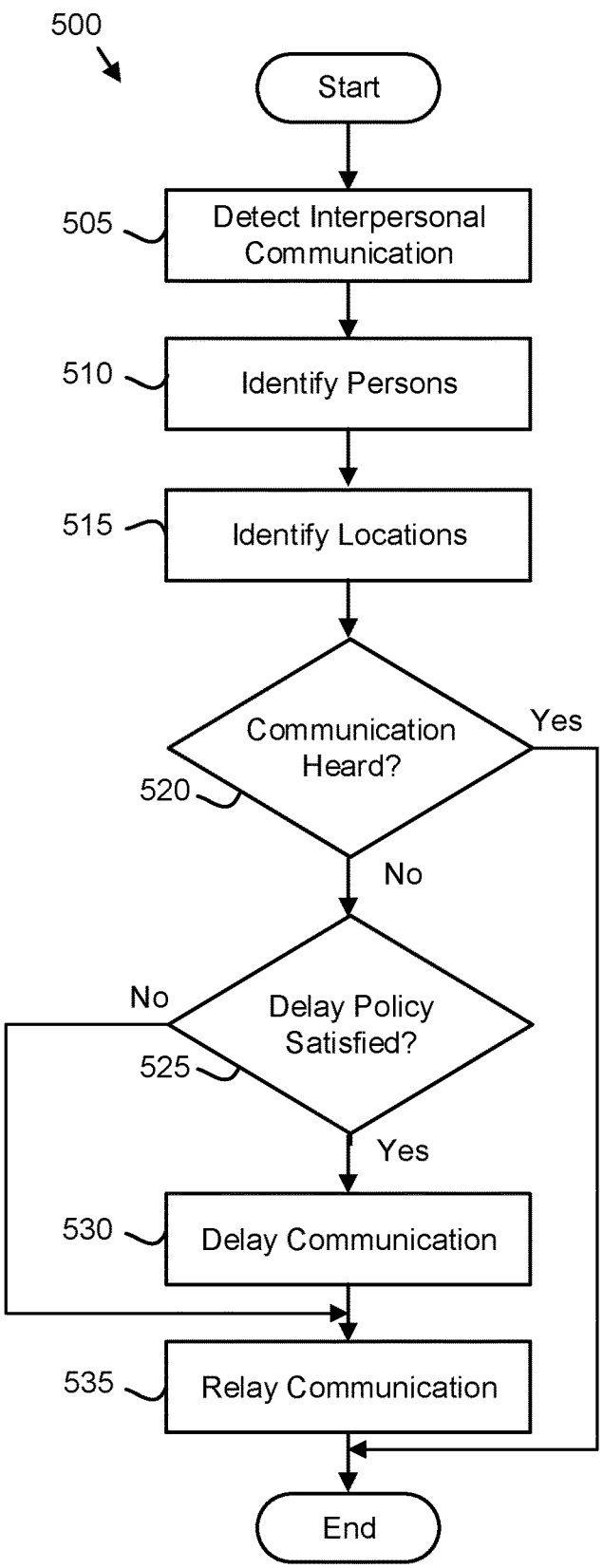
FIG. 5A is a schematic flow chart diagram illustrating one embodiment of an interpersonal communication relay method.

FIG. 5A is a schematic flow chart diagram illustrating one embodiment of an interpersonal communication relay method 500. The method 500 may relay an interpersonal communication 250 from an originator 230 to a target person 215. The method 500 may be performed by a processor 405. The processor 405 may be aided by the neural network 475.

The method 500 starts, and in one embodiment, the processor 405 detects 505 the interpersonal communication 250 from the originator 230. The interpersonal communication 250 may be detected 505 with the microphone 115 of the first electronic device 110a. The processor 405 may record the speech of the interpersonal communication 250 to the communication record 205. In addition, the processor 405 may convert the speech to text and store the text in the communication record 205.

The processor 405 may detect 505 the interpersonal communication 250 in response to one or more wake-up words 280 in the communication record 205. For example, "honey" may be a wake-up word 280. If "honey" is included in the communication record 205, the processor 405 may detect 505 the interpersonal communication 250. The processor 405 may set the interpersonal communication flag 210 in response to detecting 505 the wake-up word 280.

The processor 405 may identify 510 the target person 215 of the interpersonal communication 250. The target person 215 may be determined from the personal identifier data 265. The target person 215 may be identified from a personal identifier. In one embodiment, the processor 405 uses a wake-up word 280 as an index to determine the personal identifier data 265 as illustrated in Table 1.

The processor 405 may further identify the originator 230. In one embodiment, the processor 405 employs the biometric data 295 to determine an identity of the originator 230. For example, the processor 405 may identify the originator 230 by comparing a voice print of the originator 230 to the communication record 205. Alternatively, the processor 405 may identify the originator 230 by comparing an image of the originator 230 to an image stored in the biometric data 295.

In one embodiment, the processor 405 may identify 510 the target person 215 by process of elimination. For example, the processor 405 may identify the originator 230. The processor 405 may further identify 510 the target person 215 from persons within a building and/or grounds of the building. If only one person other than the originator 230 is within the building and/or grounds, the processor 405 may identify 510 that one person as the target person 215.

In a certain embodiment, the processor 405 identifies 510 all persons other than the originator 230 as the target person 215. For example, if the wake-up word 280 is a request word, the processor 405 may identify all persons within the building and/or grounds as the target person 215.

The processor 405 may identify 515 the target person location 220. In one embodiment, the processor 405 uses the biometric data 295 to identify 515 the target person location 220. For example, the second electronic device 110b may capture an image of the target person 215 with the camera 125 and identify the target person 215 from the biometric data 295. The target person location 220 may be identified 515 from the image of the target person 215. In addition, the target person 215 may be identified from a voice print. For example, the second electronic device 210b may capture speech from the target person 215 and identify the target person 215 from a voice print in the biometric data 295. In one embodiment, the second electronic device 110b may employ a directional microphone 120 to identify 515 the target person location 220 from the speech of the target person 215.

The processor 405 may identify 515 the originator location 235. In one embodiment, the originator location 235 may be estimated using a directional microphone 115. In addition, the originator location 235 may be estimated using the camera 125.

The processor 405 may determine 520 whether the interpersonal communication 250 was heard by the target person 215. The determination 520 of whether the interpersonal communication 250 was heard by the target person 215 is described in more detail in FIG. 5B. If the processor 405 determines 520 that the interpersonal communication 250 was heard by the target person 215, the method 500 ends.

If the processor 405 determines 520 that the interpersonal communication 250 was not heard by the target person 215, the processor 405 may determine 525 if the delay policy 285 is satisfied. If the delay policy 285 is satisfied, the processor 405 may delay 530 relaying the interpersonal communication 250. In one embodiment, the processor 405 determines 525 that the delay policy 285 is satisfied if the target person 215 is in a conversation. In addition, the processor 405 may determine 525 the delay policy 285 is satisfied if the target person 215 is inaccessible. For example, if the target person 215 is swimming, the processor 405 may determine 525 that the delay policy is satisfied because the target person 215 is inaccessible. In a certain embodiment, the target person 215 may request no disturbances. The delay policy 285 may be satisfied if the target person 215 has requested no disturbances.

In one embodiment, the processor 405 delays 530 relaying the interpersonal communication 250 for a specified delay time interval. The specified delay time interval may be in the range of 3 to 8 minutes. Alternatively, the processor 405 may delay 530 relaying the interpersonal communication 250 until the delay policy 285 is not satisfied.

If the delay policy 285 is not satisfied, the processor 405 may relay 535 the interpersonal communication 250 through the second electronic device 110b and the method 500 ends. The interpersonal communication 250 may be relayed 535 through the second electronic device 110b that is co-located with the target person 215. In addition, a second electronic device 110b that is nearest the target person location 220 may be selected to relay 535 the interpersonal communication 250.

In one embodiment, the communication record 205 is replayed to the target person from the second electronic device 110b. For example, a virtual assistant electronic device 110b or a mobile telephone electronic device 110b may replay the communication record 205 of the interpersonal communication 250 to the target person 215.

In addition, the interpersonal communication 250 may be relayed 535 by communicating the text of the communication record 205 to the second electronic device 110b. For example, the text may be communicated to the target person address 217 through the mobile telephone electronic device 110b.

Figure 5B:
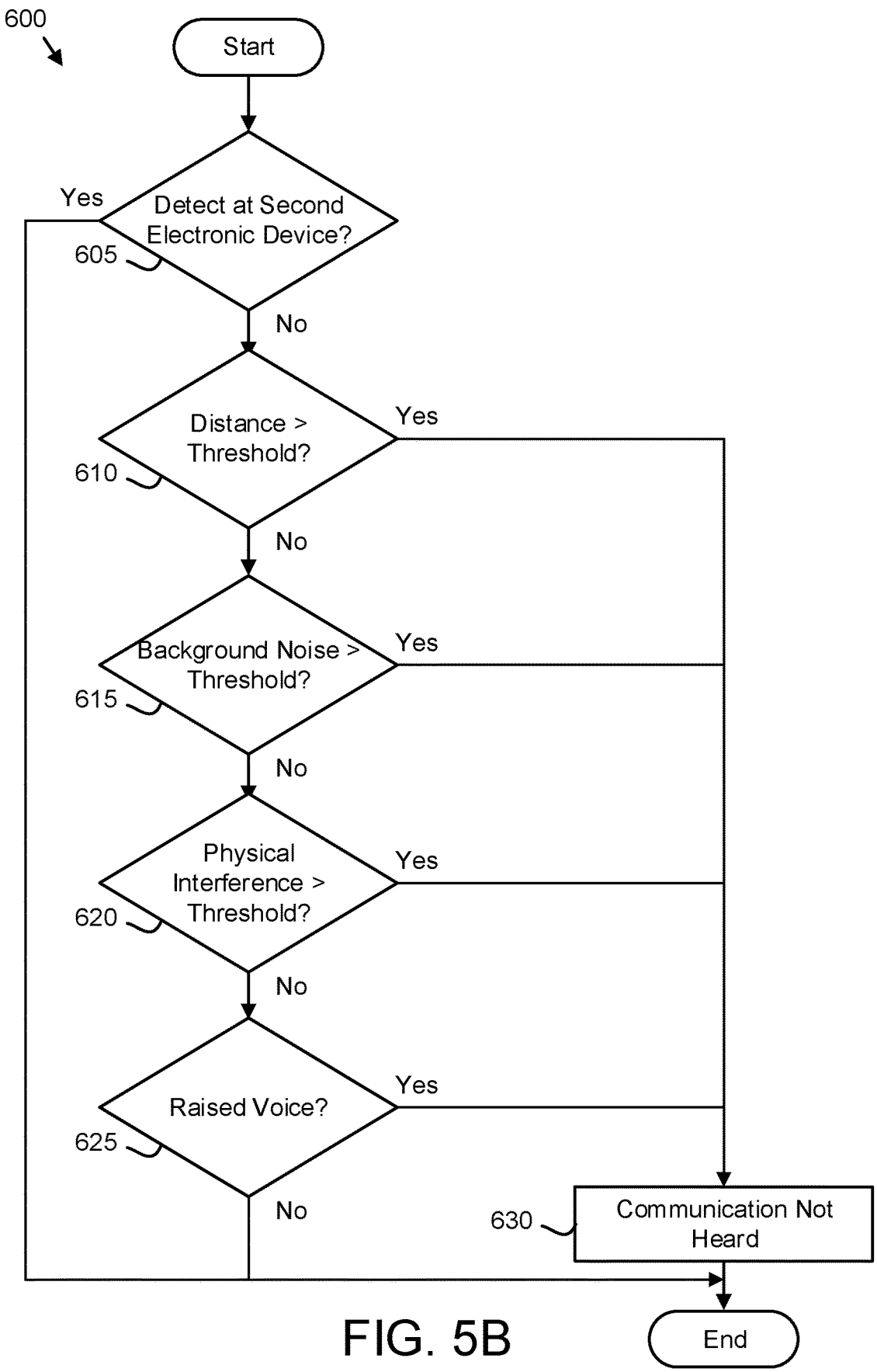
FIG. 5B is a schematic flow chart diagram illustrating one embodiment of a received communication determination method.

FIG. 5B is a schematic flow chart diagram illustrating one embodiment of a received communication determination method 600. The method 600 may determine if the interpersonal communication 250 is not heard by the target person 215. The method 600 may be performed by a processor 405. The processor 405 may be aided by the neural network 475.

The method 600 starts, and in one embodiment, the processor 405 determines 605 whether the interpersonal communication 250 is detected at a second electronic device 110b co-located with the target person 215. The processor 405 may compare received speech at the second electronic device 110b with the communication record 205. If the received speech matches the communication record 205, the processor 405 may determine that the interpersonal communication 250 is detected at the second electronic device 110b.

The processor 405 may further determine whether the second electronic device 110b is co-located with the target person 215. In one embodiment, the camera 125 of the second electronic device 110b is used to determine that the second electronic device 110b is co-located with the target person 215.

In one embodiment, the second electronic device 110b is determined to be co-located with the target person 215 if the target person location 220 is within the co-location threshold of the second electronic device 110b. The co-location threshold may be in the range of 1 to 5 meters (m). If the interpersonal communication 250 is detected at the second electronic device 110b, the interpersonal communication 250 is determined to be heard by the target person 215 and the method 600 ends.

If the interpersonal communication 250 is not detected at the second electronic device 110b, the processor may determine 610 if a distance from the originator 230 to the target person 215 exceeds the distance threshold. The distance threshold may be in the range of 5 to 10 m. The distance between the originator 230 in the target person 215 may be the distance between the target person location 220 and the originator location 235.

In one embodiment, the distance may be modified by the physical interference map 275. The distance may be modified using Equation 1, where R is the ratio of attenuation, DM is the modified distance and d is the distance.

$$DM = Rd \qquad \text{Equation 1}$$

For example, the physical interference map 275 may indicate that the ratio of attenuation R between the originator location 235 and the target person location 220 is 2.0. If the distance d is 12 m, the modified distance DM may be calculated as 24 m.

If the distance exceeds the distance threshold, the processor 405 determine 630 that the interpersonal communication 250 is not heard and the method 600 ends. If the distance is less than the distance threshold, the processor 405 may determine 615 if the background noise 240 exceeds a background noise threshold. The background noise threshold may be in the range of 60 to 80 decibels (dB). If the background noise 240 exceeds the background noise threshold, the processor 405 may determine 630 that the interpersonal communication 250 is not heard and the method 600 ends.

If the background noise 240 does not exceed the background noise threshold, the processor 405 may determine if physical interference exceeds the interference threshold. In one embodiment, the processor 405 uses the physical interference map 275 to determine a total attenuation of the interpersonal communication 250 between the originator location 235 and the target person location 220. The total attenuation may be representative of the physical interference. If the physical interference exceeds the interference threshold, the processor 405 may determine 630 that the interpersonal communication 250 is not heard and the method 600 ends.

If the physical interference does not exceed the interference threshold, the processor 405 may determine 625 if the originator 230 is speaking with a raised voice. The originator 230 may be cognizant of whether the target person 215 is likely or unlikely to hear the interpersonal communication 250. If the originator 230 speaks with a raised voice, the originator 230 may believe that the interpersonal communication 250 may not be heard.

The processor 405 may determine 625 that the originator 230 is speaking with a raised voice if the normalized volume of the interpersonal communication 250 exceeds the normalized speaking volume for the originator 250 stored in the personal preferences 270. If the originator 230 is speaking with a raised voice, the processor 405 may determine 630 that the interpersonal communication 250 is not heard and the method 600 ends. If the originator 230 is not speaking with a raised voice, the processor 405 does not determine that the interpersonal communication is not heard and the method 600 ends.

The embodiments detect the interpersonal communication 250 from the originator 230 and identify the target person 215. The embodiments further determine whether the interpersonal communication 250 was heard by the target person 215. In response to determining that the interpersonal communication 250 was not heard by the target person 215, the embodiments relay the interpersonal communication 250 to the target person 215 through the second electronic device 110b. As a result, the embodiments automatically determine if the interpersonal communication 250 should be relayed. The embodiments further relay the interpersonal communication 250 immediately, or after a delay. As a result, the interpersonal communication 250 reliably reaches the target person 215.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a microphone;
a processor;
a memory that stores code executable by the processor to:
detect interpersonal communication consisting of audio of speech from an originator with the microphone;
record the audio of the speech of the interpersonal communication to a communication record;
identify a target person of the interpersonal communication;
detect the interpersonal communication a second electronic device co-located with the target person by comparing received speech at the second electronic device with the communication record of the interpersonal communication; and
in response to not detecting the interpersonal communication at the second electronic device, relay the interpersonal communication through the second electronic device.

2. The apparatus of claim 1, wherein the interpersonal communication is further determined not to be heard in response to a distance from the originator to the target person exceeding a distance threshold.

3. The apparatus of claim 1, wherein the interpersonal communication is further determined not to be heard in response to background noise exceeding a noise threshold.

4. The apparatus of claim 1, wherein the interpersonal communication is further determined not to be heard in response to physical interference exceeding an interference threshold.

5. The apparatus of claim 1, wherein the interpersonal communication is further determined not to be heard in response to a raised voice.

6. The apparatus of claim 1, wherein the interpersonal communication is further detected in response to a wakeup word.

7. The apparatus of claim 6, wherein the wakeup word is a personal identifier comprising one of a name and a nickname and the target person is identified from the personal identifier.

8. The apparatus of claim 1, wherein the code is further executable by the processor to delay relaying the interpersonal communication in response to a delay policy being satisfied, wherein the delay policy is satisfied by one or more of the target person being in a conversation, the target person being inaccessible, and the target person requesting no disturbances.

9. A method comprising:
detecting, by use of a processor, interpersonal communication consisting of audio of speech from an originator with the microphone,
recording the audio of the speech of the interpersonal communication to a communication record;
identifying a target person of the interpersonal communication;
detecting the interpersonal communication at a second electronic device co-located with the target person by comparing received speech at the second electronic device with the communication record of the interpersonal communication; and
in response to not detecting the interpersonal communication at the second electronic device, relaying the interpersonal communication through the second electronic device.

10. The method of claim 9, wherein the interpersonal communication is further determined not to be heard in response to a distance from the originator to the target person exceeding a distance threshold.

11. The method of claim 9, wherein the interpersonal communication is further determined not to be heard in response to background noise exceeding a noise threshold.

12. The method of claim 9, wherein the interpersonal communication is further determined not to be heard in response to physical interference exceeding an interference threshold.

13. The method of claim 9, wherein the interpersonal communication is further determined not to be heard in response to a raised voice.

14. The method of claim 9, wherein the interpersonal communication is further detected in response to a wakeup word.

15. The method of claim 14, wherein the wakeup word is a personal identifier comprising one of a name and a nickname and the target person is identified from the personal identifier.

16. The method of claim 9, the method further comprising delaying relaying the interpersonal communication in response to a delay policy being satisfied, wherein the delay policy is satisfied by one or more of the target person being in a conversation, the target person being inaccessible, and the target person requesting no disturbances.

17. A program product comprising a non-transitory computer readable storage medium that stores code executable by a processor, the executable code comprising code to:
- detect interpersonal communication consisting of audio of speech from an originator with the microphone;
- record the audio of the speech of the interpersonal communication to a communication record;
- identify a target person of the interpersonal communication;
- detect the interpersonal communication at a second electronic device co-located with the target person by comparing received speech at the second electronic device with the communication record of the interpersonal communication; and
- in response to not detecting the interpersonal communication at the second electronic device relay the interpersonal communication through the second electronic device.

18. The program product of claim 17, wherein the interpersonal communication is further determined to not be heard in response to a distance from the originator to the target person exceeding a distance threshold.

* * * * *